(12) United States Patent
Lasensky et al.

(10) Patent No.: US 8,140,627 B2
(45) Date of Patent: Mar. 20, 2012

(54) SYSTEMS AND METHODS FOR PUSH-TO-EMAIL COMMUNICATION WITH LOCATION INFORMATION

(75) Inventors: Peter Joel Lasensky, San Diego, CA (US); Mark Everett Fehrenbach, San Diego, CA (US); Richard Edward Rohmann, San Diego, CA (US)

(73) Assignee: Pacific Datavision, Inc., San Diego, CA (US)

( * ) Notice: Subject to any disclaimer, the term of this patent is extended or adjusted under 35 U.S.C. 154(b) by 434 days.

(21) Appl. No.: 12/062,213

(22) Filed: Apr. 3, 2008

(65) Prior Publication Data
US 2008/0228882 A1 Sep. 18, 2008

Related U.S. Application Data

(63) Continuation-in-part of application No. 10/659,936, filed on Sep. 10, 2003, now Pat. No. 7,653,691, which is a continuation-in-part of application No. 10/174,655, filed on Jun. 19, 2002, now Pat. No. 7,054,863, which is a continuation-in-part of application No. 09/859,245, filed on May 16, 2001, now abandoned, which is a continuation-in-part of application No. 09/713,487, filed on Nov. 15, 2000, now abandoned.

(51) Int. Cl.
*G06F 15/16* (2006.01)

(52) U.S. Cl. ........ 709/206; 709/203; 709/223; 455/433; 379/88.13

(58) Field of Classification Search .................. 709/206, 709/203, 217, 223, 224; 379/88.13, 88.14, 379/88.17, 88.12, 93.24, 100.08; 455/412.1, 455/433
See application file for complete search history.

(56) References Cited

U.S. PATENT DOCUMENTS

| 5,003,576 A | 3/1991 | Helferich |
| 5,105,197 A | 4/1992 | Clagett |

(Continued)

FOREIGN PATENT DOCUMENTS

JP 08172808 12/1997

(Continued)

OTHER PUBLICATIONS

International Search Report for PCT/US04/29493 dated Sep. 29, 2005.

(Continued)

*Primary Examiner* — Lashonda Jacobs
(74) *Attorney, Agent, or Firm* — Noel C. Gillespie; Procopio, Cory, Hargreaves & Savitch LLP

(57) ABSTRACT

A push-to-email system comprises a mobile communication device configured to generate a voice message and transmit the voice message to a message authority via, e.g., a single transmit action, such as a push-to-talk transmit action. The system can also comprise a message authority configured to receive the voice message, a time stamp associated with the voice message and location information related to the location of the mobile device when the message was sent. The message authority can then generate a data message intended for a recipient associated with the voice message, such as an email message and embed the voice message, time stamp and location information, or a link to the voice message, time stamp and location information. Alternatively, the mobile communication device can be configured to generate the data message.

36 Claims, 11 Drawing Sheets

U.S. PATENT DOCUMENTS

| | | | |
|---|---|---|---|
| 5,179,627 A | 1/1993 | Sweet et al. | |
| 5,535,322 A | 7/1996 | Hecht | |
| 5,630,205 A | 5/1997 | Ekelund | |
| 5,646,839 A | 7/1997 | Katz | |
| 5,659,742 A | 8/1997 | Beattie et al. | |
| 5,675,507 A | 10/1997 | Bobo, II | |
| 5,737,532 A | 4/1998 | DeLair et al. | |
| 5,745,551 A | 4/1998 | Strauch et al. | |
| 5,796,727 A | 8/1998 | Harrison et al. | |
| 5,825,854 A | 10/1998 | Larson et al. | |
| 5,835,575 A | 11/1998 | Stoller et al. | |
| 5,867,821 A | 2/1999 | Ballantyne et al. | |
| 5,963,912 A | 10/1999 | Katz | |
| 6,009,398 A | 12/1999 | Mueller et al. | |
| 6,021,410 A | 2/2000 | Choy | |
| 6,144,942 A | 11/2000 | Ruckdashel | |
| 6,175,822 B1 | 1/2001 | Jones | |
| 6,292,783 B1 | 9/2001 | Rohler et al. | |
| 6,298,326 B1 | 10/2001 | Feller | |
| 6,321,078 B1 | 11/2001 | Menelli et al. | |
| 6,405,215 B1 | 6/2002 | Yaung | |
| 6,421,009 B2 | 7/2002 | Suprunov | |
| 6,433,732 B1 | 8/2002 | Dutta et al. | |
| 6,442,250 B1 | 8/2002 | Troen-Krasnow et al. | |
| 6,442,604 B2 | 8/2002 | Romine | |
| 6,456,852 B2 | 9/2002 | Bar et al. | |
| 6,564,071 B1 | 5/2003 | Bergins et al. | |
| 6,591,242 B1 | 7/2003 | Karp et al. | |
| 6,801,932 B1 | 10/2004 | Picoult | |
| 6,813,489 B1 | 11/2004 | Wu et al. | |
| 6,907,112 B1 | 6/2005 | Guedalia et al. | |
| 6,928,614 B1 | 8/2005 | Everhart | |
| 7,353,034 B2 * | 4/2008 | Haney | 455/457 |
| 7,403,972 B1 * | 7/2008 | Lau et al. | 709/206 |
| 2002/0057203 A1 | 5/2002 | Borders et al. | |
| 2002/0161801 A1 | 10/2002 | Hind et al. | |
| 2002/0169539 A1 * | 11/2002 | Menard et al. | 701/200 |
| 2003/0035518 A1 * | 2/2003 | Fan et al. | 379/88.17 |
| 2003/0204568 A1 | 10/2003 | Bhargava et al. | |
| 2004/0047303 A1 | 3/2004 | Fernandez et al. | |
| 2004/0161091 A1 * | 8/2004 | Fan et al. | 379/207.12 |
| 2005/0038876 A1 | 2/2005 | Chaudhuri | |
| 2005/0176451 A1 | 8/2005 | Helferich | |
| 2005/0186945 A1 | 8/2005 | Manzor | |
| 2006/0031364 A1 | 2/2006 | Hamilton et al. | |
| 2006/0038690 A1 * | 2/2006 | Shmerling et al. | 340/576 |
| 2006/0094455 A1 | 5/2006 | Hannu et al. | |
| 2006/0195540 A1 | 8/2006 | Hamilton et al. | |
| 2007/0294724 A1 * | 12/2007 | Kwon | 725/35 |
| 2010/0130173 A1 * | 5/2010 | Gupta | 455/412.1 |

FOREIGN PATENT DOCUMENTS

| | | |
|---|---|---|
| WO | 0184815 A1 | 11/2001 |
| WO | 0241222 A1 | 5/2002 |
| WO | 03096212 A | 11/2003 |

OTHER PUBLICATIONS

Sawhney and Schmandt—"Normadic Radio: Speech and Audio Interaction for Contextual Messaging in Nomadic Environments" Speech Interface Group, MIT Media Laboratory, ACM Transactions on Computer-Human Interaction, vol. 7, No. 3, Sep. 2000, pp. 353-383.

Supplementary European Search Report for related EP Application No. 05800098.5 dated Nov. 4, 2010 (7 pages).

* cited by examiner

SYSTEMS AND METHODS FOR PUSH-TO-EMAIL COMMUNICATION WITH LOCATION INFORMATION

RELATED APPLICATIONS INFORMATION

This application claims priority under 35 U.S.C. §120 as a continuation-in-part of U.S. patent application Ser. No. 10/659,936, filed Sep. 10, 2003 and now issued as U.S. Pat. No. 7,653,691, entitled "SYSTEMS AND METHODS FOR COMMUNICATING USING VOICE MESSAGES," which clams priority as a continuation-in-part to U.S. patent application Ser. No. 10/174,655 filed Jun. 19, 2002 and now issued as U.S. Pat. No. 7,054,863, entitled "SYSTEM AND METHOD FOR ORIGINATING, STORING, PROCESSING AND DELIVERING MESSAGE DATA," which claims priority as a continuation-in-part of U.S. patent application Ser. No. 09/859,245 filed May 16, 2001 now abandoned, entitled "SYSTEM AND METHOD FOR CREATING A DIGITAL PROJECT LOG," which claims priority as a continuation-in-part of U.S. patent application Ser. No. 09/713,487 filed Nov. 15, 2000, now abandoned, entitled "SYSTEM AND METHOD FOR PROJECT LOG STORAGE AND RETRIEVAL," each of which is incorporated herein by reference in their entirety as if set fourth in full.

BACKGROUND

1. Technical Field

The embodiments described herein relate broadly to the field of communications, and more particularly to a communication system and method for originating, storing, and delivering data with location information.

2. Related Art

Communication systems are used in a wide variety of data storage and retrieval applications. Some of these applications include data log systems, wireless dictation, voice mail and messaging systems, and network storage applications. Communication systems employing networked communication devices have largely supplanted traditional hardcopy file systems and note-taking techniques. The shortcomings of these and other traditional techniques are well-known: they are tedious, difficult to organize and comprehend, easily misplaced, and hard to secure.

However, some conventional communication systems have their own limitations. One example is the use of a recording device to memorialize an observation or event. The recording device may be a tape recorder or a video recorder, where the recording preserves a monitoring person's observations on a recording medium such as a cassette tape, microcassette, or video cassette. The recording medium can be lost or otherwise inaccessible. If it is accessible, it is usually accessible to only one user or otherwise limited to a small number of persons who must each maintain a copy. The copies are also difficult to reproduce and distribute effectively. Further, recordings are difficult to compile in a way that the recording media can be arranged in some logical, easily retrievable order.

Additional problems exist with conventional data storage or recording mechanisms for keeping records. One additional problem relates to control of the data. A voice mail system, for example, stores messages from a sender, but the sender relinquishes complete control of the messages to either a recipient or a third party over whom the sender has no control. Without adequate controls, data integrity and security can be lost.

Another additional problem is complexity. Again, using voice mail as an example, the sender must first dial a long telephone number, and then usually has to navigate to a storage location by keying in many more numbers or access codes. Each keystroke requires time and concentration, and as such diminishes the likelihood of successfully reaching a destination.

One further problem with conventional communication systems is the lack of ease with which data can be delivered once it has been received and stored. There are many techniques and platforms for communicating data; however, conventional techniques and platforms lack end-to-end security while still allowing automated delivery. Further, most systems are non-scalable, and cannot support a large number of users and/or recipients.

Limitations related to data storage and retrieval are not the only problems associated with conventional communication systems. For example, while conventional communication systems provide a plurality of methods for mobile users to stay connected, e.g., with work, home, clients, etc., these mechanisms can often be tedious, difficult and inefficient, which limits their usefulness. Often, a mobile user must attempt to "punch" in short messages on a small keyboard attached to their mobile communication device, or wade through hierarchical menus to generate or leave a message or contact a specific individual.

Because existing methods are so limiting, effective communication is difficult. Often messages sent leave out important information or are confusing. But even worse, existing methods are often not taken advantage of because of the difficulty in using them efficiently. Accordingly, mobile users are not effectively connected, which can reduce efficiency.

Further, existing systems have limited ability to take advantage of advanced features, such as location based information and services, or taking advantage of such services is tedious and inefficient.

SUMMARY

A communication system comprises a communication device configured to generate and send push-to-email message that includes a voice message and location information using a simple transmit action.

According to one aspect, the communication device is configured to receive a spoken reply and store it as a voice message. The communication device can be configured to then generate a voice reply by attaching the stored voice message to a data message and then send the voice reply via the return path determined based on an identifier.

According to another aspect, the spoken reply can be transmitted to a message authority that can be configured to generate the voice reply by storing the voice reply as a voice message and attaching the stored voice message to a data message to generate a voice reply. The voice reply can then be sent via a return path determined based on the identifier.

According to still another aspect, the message authority can generate and/or store a time stamp associated with the voice reply.

According to still another embodiment, the message authority can be configured to also receive location information related to the communication device. The message authority can then send a data message such as an email message to a destination associated with the return path, wherein the voice message, time stamp and location information, or a link to the information is embedded in the data message.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

FIGS. 1-9 of the following description are reproductions of FIGS. 14-22 from the Ser. No. 10/659,936 application. For the sake of brevity, FIGS. 1-13 of the Ser. No. 10/659,936 application and the accompanying description are not reproduced herein, although these figures and description may be referred to in the description below.

Figure 1:
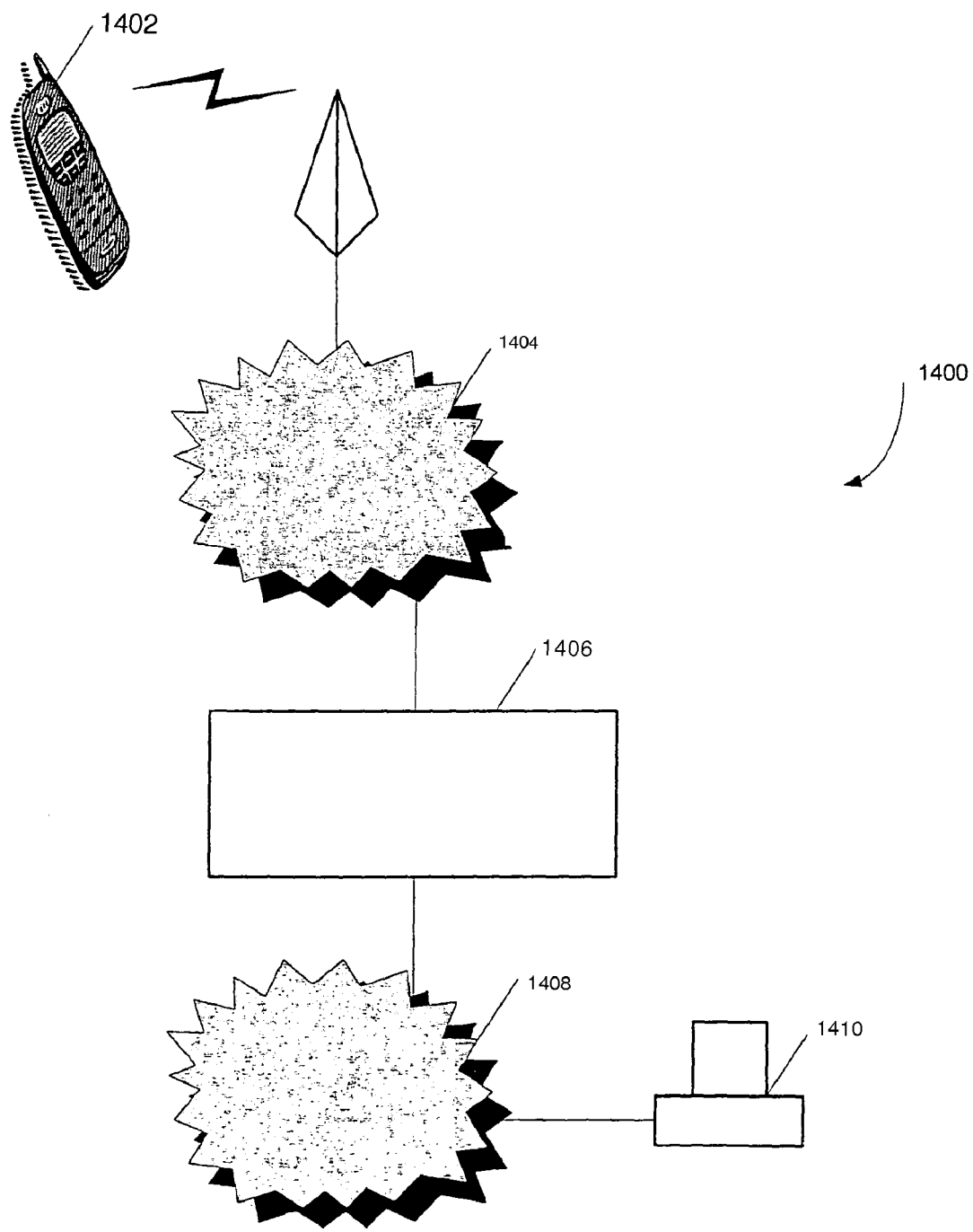
FIG. 1 is a diagram illustrating an example communication system according to one embodiment.

FIG. 1 is a diagram of a communication system 1400 that can be configured for efficient communication using a mobile device 1402 in accordance with one embodiment of the systems and methods described herein. System 1400 can be similar to system 800 described in relation to FIG. 8 of the Ser. No. 10/659,936 application. Thus, system 1400 can comprise a communication device 1402 configured for mobile communication that can be a device similar to device 210 also described in relation to FIG. 8 of the Ser. No. 10/659,936 application. Specifically, communication device 1402 can have a transmit action input enabling a user of communication device 1402 to reply to data messages received by device 1400 using a simple transmit action. As described above the term transmit action can refer to a variety of actions that result in some form of input and/or indication being received by communication device 1402.

For example, with push-to-talk type phones, the transmit action can be the depression and then release of the push-to-talk input mechanism. Thus, when the push-to-talk input mechanism is activated, the process of replying can be initiated, and when the push-to-talk mechanism is deactivated, the process of replying, at least from the perspective of communication device 1402, can be completed. The push-to-talk mechanisms can comprise a button, e.g., on the side of communication device 1402, that operates in a manner similar to a walkie-talkie, i.e., the user depresses and holds the button to talk, and releases the button when they are done.

It should be apparent that the push-to-talk mechanism can comprise some other type of input mechanism such as a key on a keypad, an active input on the display of communication device 1402, e.g., one that is activated using a stylus, or any other mechanism that is incorporated into communication device 1402. Moreover, the transmit action can actually be accomplished using more than one input mechanism. For example, one button can be activated to cause communication device 1402 to begin the process of creating a voice reply, while another button can be used to indicate that the reply is complete. The second button can, for example, also cause the reply to be sent. Alternatively, a third button, or input mechanism, can be used to cause communication device 1402 to send the reply.

In other embodiments, a single mechanism, such as those described above, can be used; however, multiple inputs generated using the single mechanism can be required. For example, in one embodiment, a push-to-talk type mechanism can be used, but the process of replying can require the user to press, or activate, the push-to-talk mechanism once to initiate the reply process, and then press, or activate, the push-to-talk mechanism a second time to end the process, at least from the perspective of communication device 1402.

In other embodiments where, for example, communication device 1402 is configured for voice recognition, the transmit action can also comprise speaking voice commands, such as "generate voice message" and "send voice message."

In short, the term transmit action is intended to refer to a simple action, or set of actions, that can be easily performed to initiate and terminate the reply process from the perspective of communication device 1400. Thus, by using the transmit action, the inefficiency of scrolling through menus, or contact lists, activating certain programs, and/or interfacing with remote servers in order to generate and send a reply can be avoided.

Communication device 1400 can be interfaced with a message authority 1406 through a network 1404. Message authority 1406 can, for example, be a server system, such as server system 208 described in relation to FIG. 8 of the Ser. No. 10/659,936 application. Thus, message authority 1406 can, depending on the embodiment, comprise a collector 220, data center 230, and communication server 240 all described in relation to FIG. 8 of the Ser. No. 10/659,936 application. In general, message authority 1406 can be configured to receive messages and route them to the appropriate destination. Message authority 1406 can also be configured to format the messages and to store the messages and/or related data, e.g., metadata as required by a particular implementation.

The term "authority" used to identify message authority 1406 is intended to indicate that communication devices 1400 and client device 1410 communicate with message authority 1406 through the communication and computing systems, hardware and software, associated with message authority

1406. Thus, depending on the embodiment, the term authority can refer to one or more servers, such as Internet or web servers, file servers, and/or database servers, one or more routers, one or more databases, one or more software applications, one or more Application Program Interfaces (MIS), one or more communication networks, such as PANS or LANS, and one or more communication buses, or some combination thereof. Further, the computing system associated with message authority 1406 can include one or more computers or computer terminals. Moreover, custom communication interfaces, such as those associated with collector 220 of FIG. 8 of the Ser. No. 10/659,936 application, can also be included in message authority 1406.

Because communication device 1402 can be a mobile communication device, it can also comprise a wireless transceiver configured to enable communication device 1042 to send and receive wireless signals. Thus, network 1404 can comprise some form of wireless communication network, such as a wireless PAN, wireless LAN, wireless WAN, or a wireless Metropolitan-Area Network (MAN).

Message authority 1406 can also be configured to interface with a client device 1410 via network 1408. Client device 1410 can be any device configured to communicate data messages, e.g., using an email client or web browser, over network 1408. Further, all or part of network 1408 can comprise part of network 1404, or network 1408 can be completely separate form network 1404 depending on the embodiment.

The ability for communication device 1402 to quickly and efficiently generate a message using a transmit action and send it to a message authority 1406, where it can be recorded and stored, is described in detail in the Ser. No. 10/659,936 application. In addition, however, system 1400 can be configured to allow a user of client device 1410 to generate a data message, such an email message, and send it to communication device 1402. Communication device 1402 can be configured to receive the data message and to cause a voice reply to be generated and sent to client device 1410 by simply performing a transmit action using the transmit action mechanism associated with communication device 1402 and speaking an appropriate reply. The spoken reply can be captured by communication device 1402 and used to generate the voice reply, which is sent to client device 1410. The voice reply can, for example, comprise a voice message that can be accessed and played using client device 1410.

Accordingly, a user of communication device 1402 can quickly and efficiently communicate with a user of client device 1410 by simply activating the transmit mechanism and speaking into communication device 1402. Further, the user of client device 1410 can access the voice reply at their convenience, which can make communication more efficient for the user of client device 1410 as well.

Figure 2:
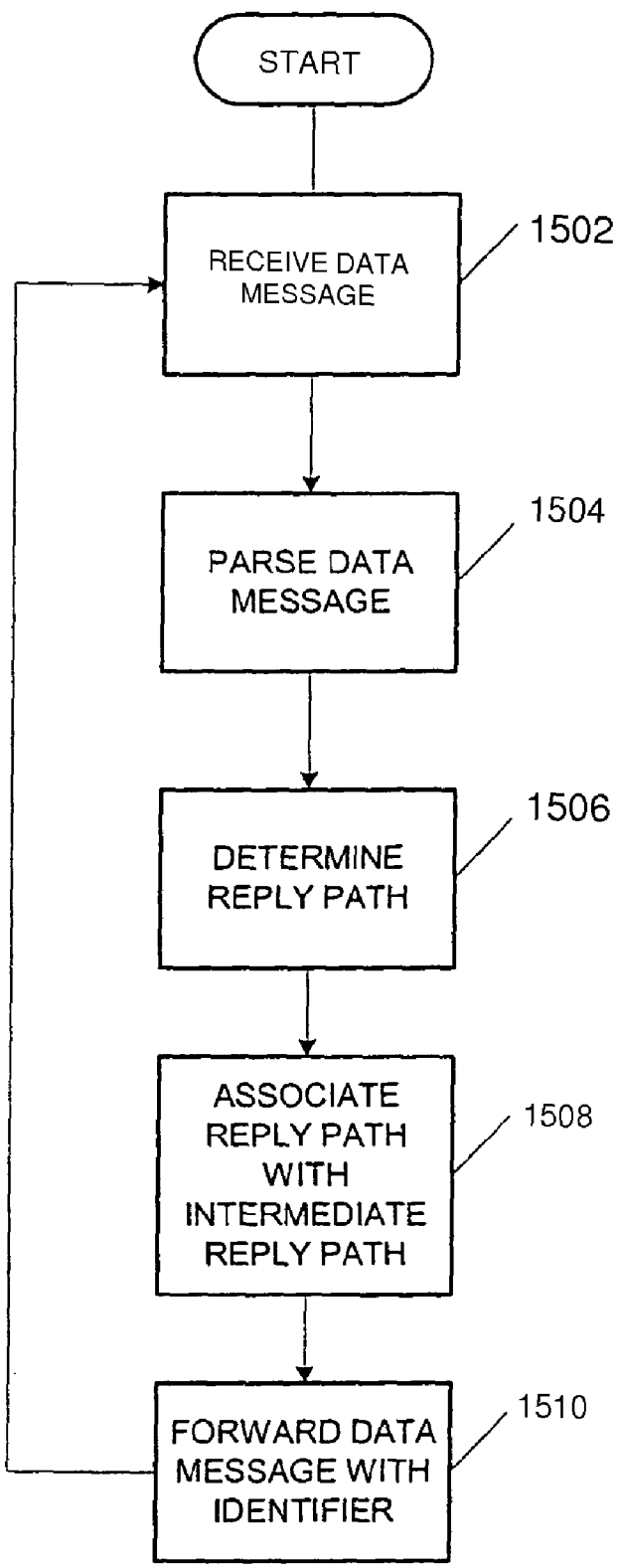
FIG. 2 is a flow chart illustrating an example method for forwarding a data message to a communication device within the system of FIG. 1 in accordance with one embodiment.

In the embodiment illustrated in FIG. 1, message authority 1406 can act as a go between to facilitate communication between client device 1410 and communication device 1402 as briefly described above. FIG. 2 is a flow chart illustrating an example method for communicating between communication device 1402 and client device 1410 using message authority 1406 in accordance with one embodiment of the systems and methods described herein.

The process of FIG. 2 begins in step 1502 with the receipt by message authority 1406 of a data message generated by client device 1410. In one embodiment, for example, client device 1410 generates and sends a text message such as an email. Thus, the data message received by message authority 1406 can include some textual content. The data message generated by client device 1410 can be any type of data message. Thus, for example, the data message can be generated using an Instant Messaging (IM) application or the like. Similarly, the data message can be an SMS or two-way text message. Moreover, the content of the data message can include other content instead of, or in addition to, textual content. For example, the data message can include, depending on the embodiment, audio content.

The data message received by message authority 1406, in step 1502, can also include an identifier that can be used to determine a reply path associated with client device 1410. Thus, message authority 1406 can be configured to parse, in step 1504, the received data message in order to determine the reply path associated with client device 1410. In certain embodiments, the data message can then be forwarded to communication device 1402 with the reply path included. For example, if message authority 1406 is an email server, then the data message, which would be an email message in this case, can be forwarded to communication device 1402. The email message received by communication device 1402 will then include the email reply path as with any other email message.

In the example of FIG. 2, however, message authority 1406 can be configured to associate the reply path with an intermediate reply path in step 1508. The data message can then be forwarded, in step 1510, to communication device 1402. But the forwarded message can include an identifier that can be used to determine the intermediate reply path instead of the actual or final reply path determined in step 1506.

For example, if message authority 1406 includes a collector as described above, then the intermediate reply path can specify which of the receivers included in the collector is associated with the reply path determined in step 1506. Thus, the data message received by communication device 1402 can include an identifier that can be used to determine which of the receivers communication device 1402 should connect with when replying to the data message. In alternative embodiments, an electronic gateway or router configured to route the voice reply to message authority 1405, which can in turn be configured to direct the voice reply to the appropriate destination within message authority 1406 based on the identifier.

Figure 3:
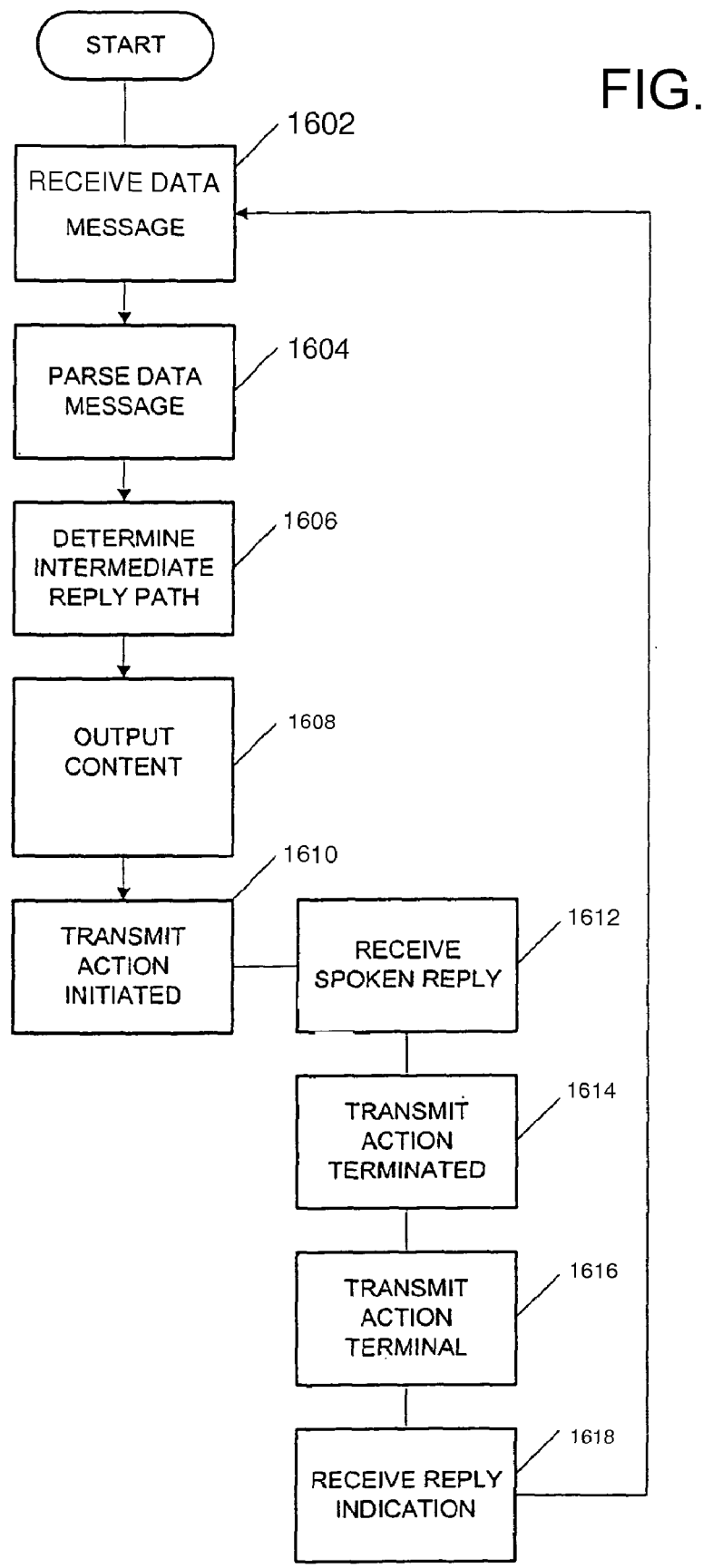
FIG. 3 is a flow chart illustrating an example method for replying to a data message with a voice reply within the system of FIG. 1 in accordance with one embodiment.

FIG. 3 is a flow chart illustrating an example process whereby communication device 1402 can receive and reply to a data message in accordance with one example embodiment of the systems and methods described herein. First, in step 1602, communication device 1402 can be configured to receive the data message. In step 1604, the content of the data message can be output to a user of communication device 1402. Thus, for example, if the data message comprises textual information, then outputting the content in step 1604 can comprise displaying the textual content on a display associated with communication device 1402. Communication device 1402 can also be configured to parse the data message, in step 1606, to determine the reply path associated with the data message in step 1608, e.g., using an identifier included with the data message.

Depending on the embodiment, the data message can be stored on communication device 1402 for later retrieval, e.g., retrieval at the convenience of the user. In step 1610, the user can then initiate a transmit action using a transmit action mechanism associated with communication device 1402 and reply to the data message, or more specifically the content of the data message, by speaking into communication device 1402. Thus, in step 1612, communication device 1402 can be configured to receive the spoken reply.

In the embodiment of FIG. 3, the spoken reply is then transmitted by communication device 1402 in step 1616, in response to the termination of the transmit action in step 1614. For example, in one implementation, the transmit action mechanism can be a push-to-talk type of input mechanism. Thus, initiating the transmit action in step 16 10, can comprise pressing and holding the push-to-talk input mechanism and terminating the transmit action in step 1616 can comprise releasing the push-to-talk input mechanism. Alternatively, initiating the transmit action in step 1610—can comprise pressing and releasing the push-to-talk input mechanism and terminating the transmit action in step 1614 can comprise pressing and releasing the push-to-talk input mechanism a second time.

As explained above, a variety of transmit action mechanisms and combinations of actions can be used to effect the initiation and termination of the transmit action as described in relation to FIG. 3; however, unlike conventional systems, there is no need to navigate through a variety of menus, or to activate a special program in order to reply to the data message received in step 1602. Moreover, the reply can be made by simply speaking into communication device 1402. The spoken reply can then be formatted into a voice message that can be sent to client device 1410 as a voice reply. This process is described in more detail below.

The spoken reply can be transmitted, in step 1616, along the reply path indicated by the identifier associated with the received data message and determined in step 1608. As described below, the reply path can be the actual or final reply path, or it can be an intermediate reply path associated, e.g., with message authority 1406.

In step 161 8, communication device 1402 can receive a response indicating whether the reply was successfully received. For example, some form of audible indication can be received and output by device 1402. In one particular implementation, an audible indication comprising three tones, or "beeps", is received if the reply is successful.

Figure 4:
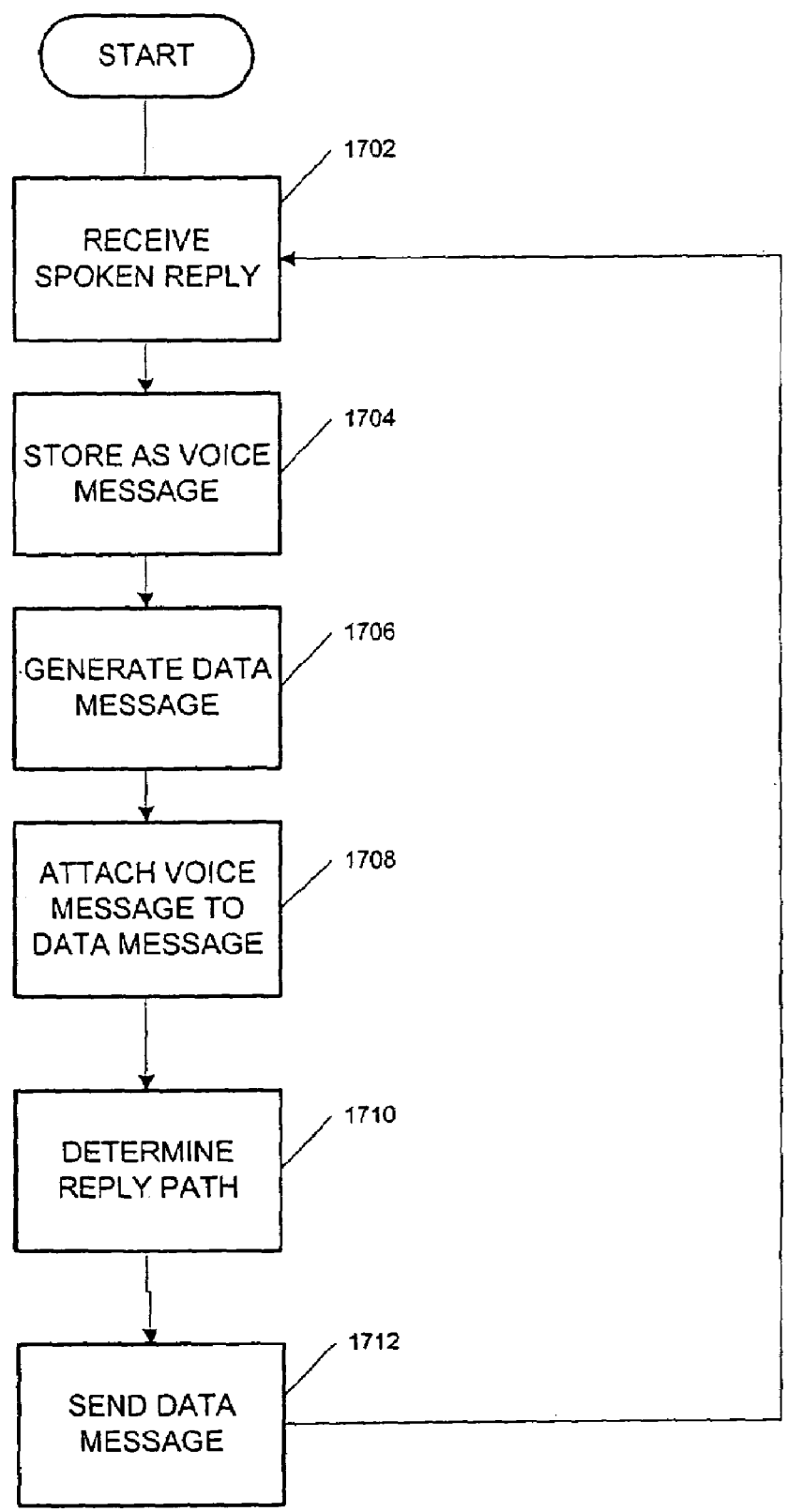
FIG. 4 is a flow chart illustrating an example method for generating a voice reply using a message authority included in the system of FIG. 1 in accordance with one embodiment.

In the example of FIG. 3, communication device 1402 can simply transmit the spoken reply in much the same way that a mobile device would normally transmit messages spoken into the device. In such embodiments, message authority 1406 can be configured to receive the spoken reply and to generate from the spoken reply a voice reply that can be sent to client device 1410. FIG. 4 is a flow chart illustrating an example method for creating a voice reply using message authority 1406 in accordance with one example embodiment of the system and methods described herein.

First, in step 1702, message authority 1406 receives the spoken reply, e.g., using a collector as described in the Ser. No. 10/659,936 application. In step 1704, the spoken reply can be stored as a voice message. It will be understood that when a communication device, such as communication device 1402, transmits voice signals, the voice signals are often processed and formatted for transmission via network 1404. For example, the voice signals are often digitized, compressed, and then packaged according to the protocols associated with network 1404. Thus, in order to store a spoken reply as a voice message in step 1704, it will be understood that message authority 1402 will often be required to process and format the received spoken reply. The processed spoken reply can then be stored as a voice message, e.g., the spoken reply can be saved as a digital audio file.

Message authority 1402 can be configured to then generate a data message, e.g., an email, in step 1706, and to attach the voice message in step 1708 for transmission to client device 1410. In certain embodiments, the received spoken reply can be processed and formatted into a voice message and attached to a data message without being stored in step 1704, although practically, the voice message needs to be stored at least temporarily during the process.

The combination of the data message and attached voice message is referred to herein as a voice reply. The voice reply is transmitted, in step 1712, to client device 1410. First, however, the reply path associated with client device 1410 is looked-up and used to send the voice reply to client device 1410. For example, message authority 1402 can store the reply path determined in step 1506. The reply path can then be accessed in step 1710.

In one embodiment, compound indexing as described in the Ser. No. 10/659,936 application can be used to access the reply path. For example, when the reply path is determined in step 1506, it can be associated with the intermediate reply path, e.g., that identifies which receiver, or a receiver identifier, that communication device 1402 should use to reply to the data message. When the spoken reply is received in step 1702, it can comprise an identifier that can be used to identify the user of communication device 1402. The combination of the user identifier and intermediate reply path can then be used to access the reply path.

It should be noted that the user identifier can simply identify communication device 1402; however, in embodiments where more than one user can use communication device 1402 it is preferable that the identifier associated with the spoken reply identify the actual user.

Figure 5:
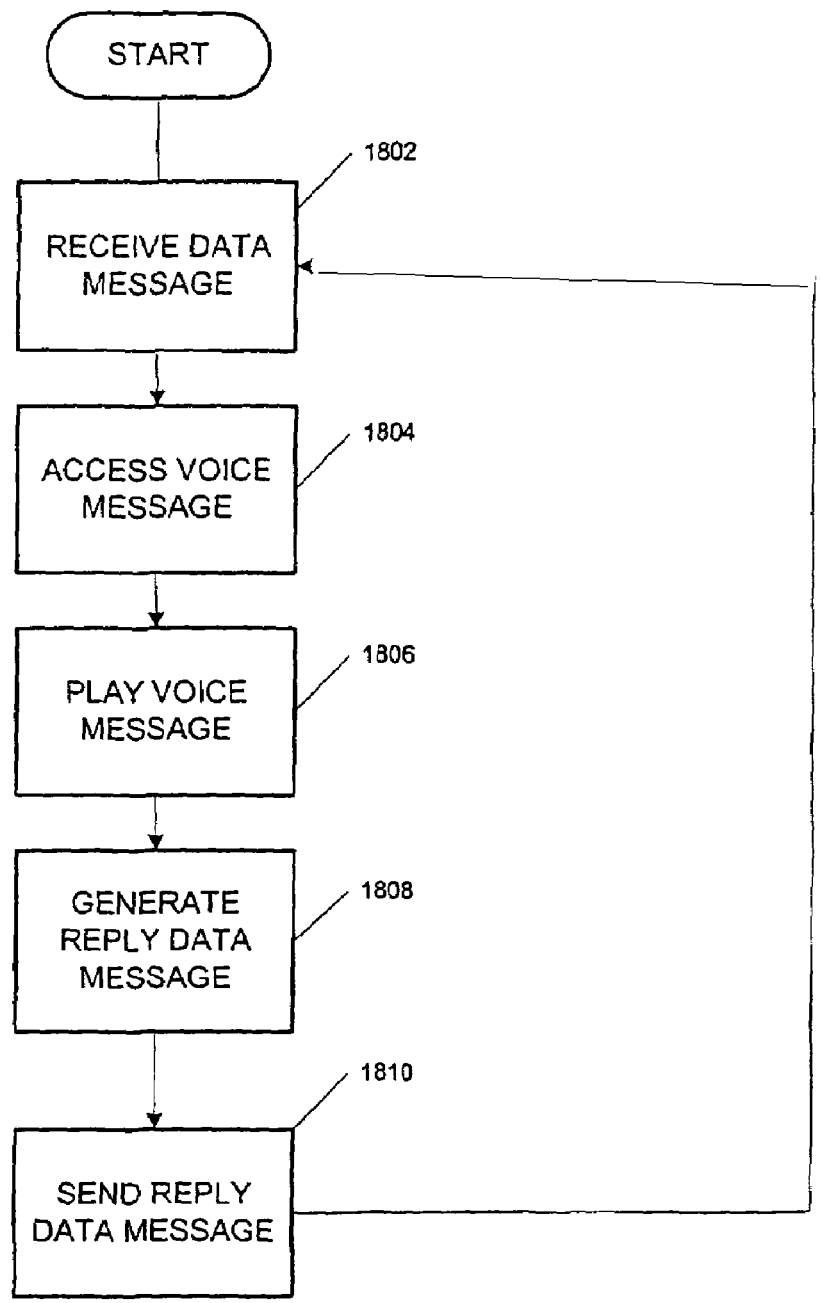
FIG. 5 is a flowchart illustrating an example method for retrieving a voice message within the system of FIG. 1 in accordance with one embodiment.

FIG. 5 is a flow chart illustrating an example method whereby client device 1410 can receive a voice reply according to one embodiment of the systems and methods described herein. First, in step 1802, client device 1402 receives the voice reply. Thus, receiving the voice reply in step 1802 can comprise receiving the data message, e.g., generated in step 1706, and then accessing an attached voice message. The data message can, for example, comprise an email that client device 1410 receives using an email client.

Alternatively, client device 1410 can comprise a web browser and receiving the voice reply in step 1802 can comprise accessing a web page through which the voice message can be accessed. As explained in relation to FIG. 12 of the Ser. No. 10/659,936 application, the web page can include a media player configured to render the voice message in whichever media format the voice message exists. Thus, in certain embodiments, a data message, such as an email can be used to provide access to the voice message. Attached to, or embedded in, the email can be a link, or similar mechanism, that allows client device to access a web page and play the voice message.

Again as explained above, the voice message can be delivered to, and stored on client device 1410. Alternatively, the voice message can be maintained on message authority 1406 and accessed using client device 141 0 when it is convenient for the user.

Accordingly, in step 1806, the voice message can be played via client device 1410. For example, the voice message can be played using media player 1204 illustrated in FIG. 12 of the Ser. No. 10/659,936 application.

It should be noted that the voice message does not necessarily need to be attached to the data message sent to client device 1410. Rather, as just described, a data message can be sent to client device 14 10 informing a user of client device 1410 that a voice message is pending. The user can then access the voice message directly, e.g., using a web browser.

In certain embodiments, client device 1410 can be configured to allow the user to quickly generate a reply data message, in step 1808, and send it back to communication device 1402 in step 1810. For example, the process for replying to the received voice reply can be similar to that described in relation to FIG. 12 of the Ser. No. 10/659,936 application for replying to a received audio message. Thus, a web page accessed using client device 1410 can include a text input window 1206 (see FIG. 12 of the Ser. No. 10/659,936 application), which can, for example, be displayed separately from or combined with media player 1204 (see FIG. 12 of the Ser. No. 10/659,936 application). Text input window 1206 (see FIG. 12 of the Ser. No. 10/659,936 application) can be configured to receive an input from an input device such as a keyboard, keypad, touchpad, or a voice input device used with a voice-to-text conversion program.

The data message received from message authority 1406, in step 1802 can also comprise an identifier that can be used to determine a reply path associated with the data message. Depending on the embodiment, the reply path can be associated with communication device 1402, or for example, with message authority 1406. Thus, the reply data message can be sent, in step 1810, to message authority 1406, where it can be processed in the same manner as the original data message (see FIG. 2) and then routed to communication device 1402. Communication device 1402 can then receive the reply data message and generate another voice reply.

Figure 6:
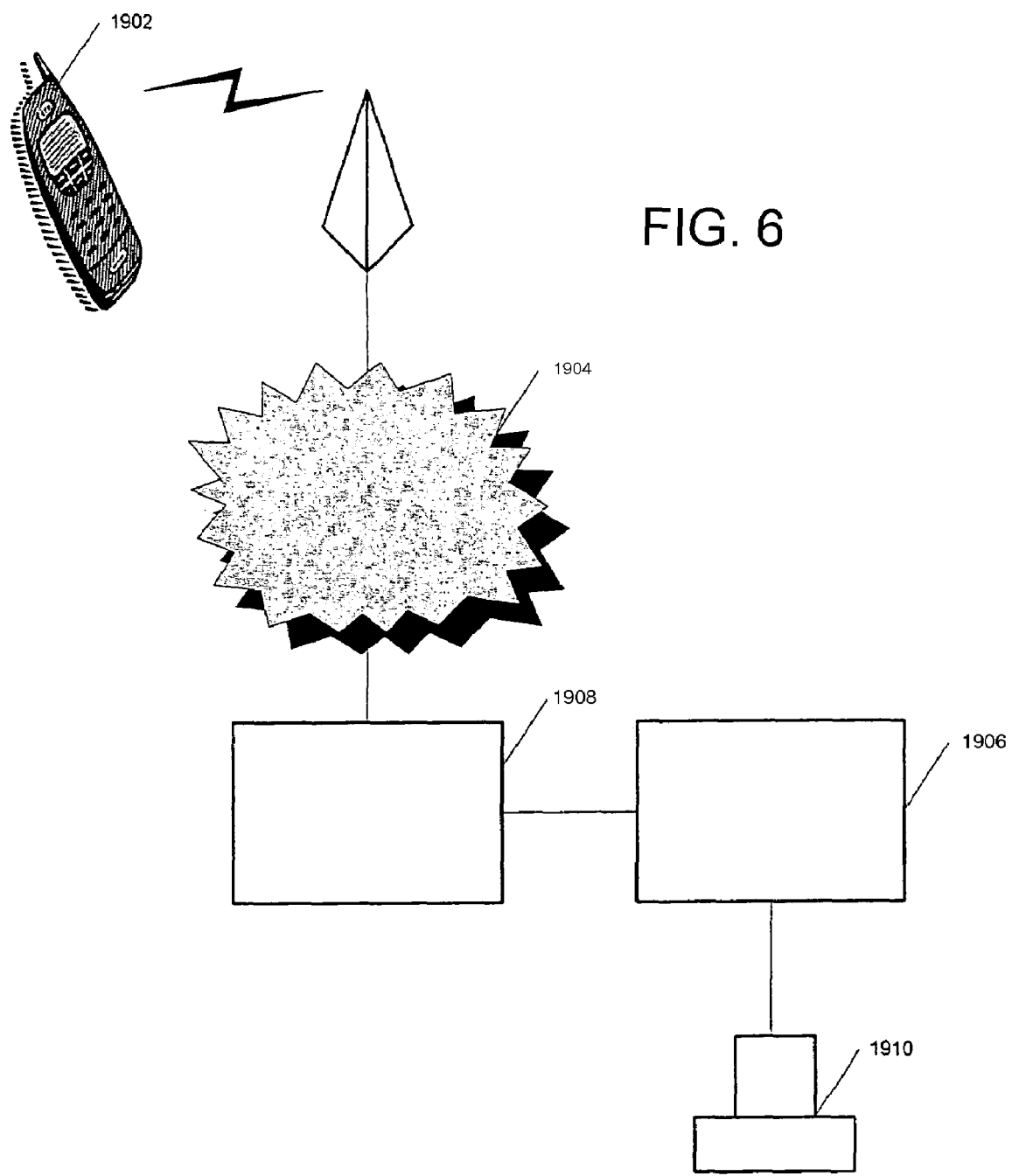
FIG. 6 is a diagram illustrating an example communication system in accordance with another embodiment.

FIG. 6 is a diagram illustrating an alternative embodiment of a communication system 1900 configured in accordance with one embodiment of the systems and methods described herein. System 1900 illustrated in FIG. 6 includes a communication device 1902 as well as a client device 1910. These devices can be similar to devices 1402 and 1410, respectively, as illustrated and described in relation to FIG. 1 above; however, in the example of FIG. 6, communication device 1902 can be configured to generate a voice reply and forward it to client device 1910 without the aid of message authority 1406.

Accordingly, communication device 1902 can be configured to receive a data message from client device 1910, output, e.g., display, the content of the data message, and receive a spoken reply initiated using a transmit action. Once the spoken reply is received, communication device 1902 can be configured to format and store the spoken replay as a voice message. Communication device 1902 can be configured to then generate a voice reply that includes the voice message and forward it directly to client device 1910 using a reply path determined from an identifier included in the received data message.

For example, in one embodiment, communication device 1902 can be configured to receive an email data message directly from client device 19 10. Thus, as with any other email message, the data message that is received by communication device 1902 should include the email reply path. It should also be understood, that client device 191 0 will, in such embodiments, be interfaced with an email server 1906 to facilitate the sending and receiving of emails, as will communication device 1902. Accordingly, in the example of FIG. 6, communication device 1902 is illustrated as being interfaced with some form of message server, i.e., an email server 1908, through a wireless network 1904.

In general, communication device 1902 and client device 1910 should be interfaced with some form of message server to facilitate direct communication, i.e., communication without the aid of message authority 1406; however, such message servers, e.g., message servers 1908 and 1906, can still be referred to as message authorities.

In order to generate a voice reply, communication device 1902 should have the capability of receiving the spoken reply, in response to a transmit action, and saving it as a voice message. Communication device 1902 should also have the capability to generate a data message, attach the voice message, and transmit the data message and attached voice message to client device 1910, e.g., via message servers 1908 and 1906.

Similarly, client device 1910 can have the capability to receive the data message and attached voice message and to play the attached voice message. In one embodiment for example, communication device 1902 includes and email client 242 as does client device 1910. Additionally, communication device 1902 includes the processing and memory capabilities to receive the spoken reply and save it as a voice message, e.g., a digital audio file. Communication device 1902 can be configured to then generate the voice reply and send it to client device 1910. Client device 1910 can then have the ability to access the voice message and play it for the user.

It should be noted that the data message received by communication device 1402, or 1902, can comprise a request for specific information. For example, the data message can be originated by a dispatcher requesting a user associated with communication device 1402 to make a specific pickup or drop off, e.g., the user can be a taxi driver and the data message can include a request that the taxi driver make a certain pickup. The voice reply sent to client device 1410, or 1910, in response to the data message can then comprise a response to the specific request contained in the data message.

Accordingly, the systems and methods described herein can be used to facilitate quick and efficient communication of essential information. The result can be increased efficiency and a reduction in costs created by delays and/or miscommunication.

As described in relation to FIG. 6, the systems and methods described herein do not necessarily need a custom or modified message authority; however, further aspects of the systems and methods can be enabled depending on the functionality included in communication device 1402, message authority 1406, and/or client device 1410. For example, message authority 1406 can be configured to allow a user of communication device 1402 to access and maintain user profile information including an address book. In certain embodiments, the user can access message authority 1406 to update and maintain their user profile information using their communication device 1402. In other embodiments, however, the user can alternatively, or in addition, access message authority 1406 using a client device 1410 to maintain their user profile information.

In one embodiment, for example, the user can access message authority 1406 via a web browser interface to update their user profile information. In one particular implementation, the user accesses a web page being hosted by message authority 1406 and enters a user name and/or password to access their user profile. Once the user has accessed their user profile, the user can update their user profile information, such as their user name, password, contact information, etc. Further, the user can, depending on the embodiment, update and maintain an address list as well.

For example, in one embodiment, a contact can be associated with an identifier that can be used to identify a communication path associated with the contact. The contact and the associated identifier can then be stored in an address list associated with the user. When the user wants to send a voice message to a particular contact as described above, the user's communication device can use the identifier associated with the intended recipient.

In one specific implementation, for example, communication device 1402 is a push-to-talk device that uses push-to-talk numbers to allow communication between push-to-talk devices. Thus, each contact can be associated with a push-to-talk number. The user can then access message authority 1406 and enter contact names. Message authority 1406 can be configured to then associate those contact names with a push-to-talk number. The contact names, and associated push-to-talk numbers, can then be uploaded to communication device 1402, e.g., via network 1404, or they can be manually input into communication device 1402, depending on the implementation.

If the user of communication device 1402 then wants to send a voice message to one of the contacts, the user can simply select the push-to-talk number associated with the contact, e.g., using a transmit action, and speak into communication device 1402 to generate a voice message.

In other embodiments, such as the embodiment illustrated in FIG. 6, where communication device 1902 is capable of sending and receiving data messages, an address list does not necessarily need to be configured and loaded into communication device 1402 before it can be used to send voice messages. This is because an identifier, such as an email address, can be input directly into communication device 1402 when generating a voice message. Moreover, a received data message will generally include an identifier, such as the email reply path that can be used to identify the reply path associated with the received data message. Thus, simply by initiating a transmit action, a voice reply can be generated and sent to the sender of the data message without the need to configure an address list.

Even in these embodiments, however, it can be more convenient to create an address list that includes contact email addresses. Thus, message authority 1406 can be used to create such an address list, which can then be uploaded to communication device 1402 via network 1404, or the address list can simply be entered into communication device 1402, depending on the embodiment.

In embodiments where an address list is maintained by message authority 1406, a user of client device 1410 can initiate and send a data message to a communication device 1402 by accessing message authority 1406, e.g., via a web browser 244, and inquiring as to which communication device users have added the user of client device 1410 to their address lists. If more than one user has added the user of client device 1410 to their address list, then a list of such users can be presented to the user of client device 1410. The user of client device 1410 can then be allowed to select one of the users from the list and generate a data message to be sent to the communication device 1402 associated with the selected user.

Accordingly, a user does not need to know anything more than their own address or identifier in order to send and receive messages to or from one or more communication devices 1402. In other words, the user of client device 1410 doesn't need to know the address or identifier associated with a particular user or client device 1402. Not does a user of client device 1410 need to know what type of device or communication program the user or client device 1402 is using. In fact, the user of client device does not even need to know that a user of a communication device 1402 has added them to their address list, at least not ahead of time.

In one implementation, for example, the user of client device 1410 can select a user from the list of users presented by message authority 1406. The user of client device 1410 can then generate a data message intended for the user's communication device 1402. The user of client device 1410 can then send the data message, which can include an identifier that can be used to determine a reply path associated with client device 1410. The data message can then be forwarded to communication device 1402.

The data message can, as described above, actually be sent to message authority 1406, which can be configured to associate an intermediate reply path with the received message. The user of communication device 1402 can then send a voice reply using a transmit action as described above in response to receiving the data message.

Figure 7:
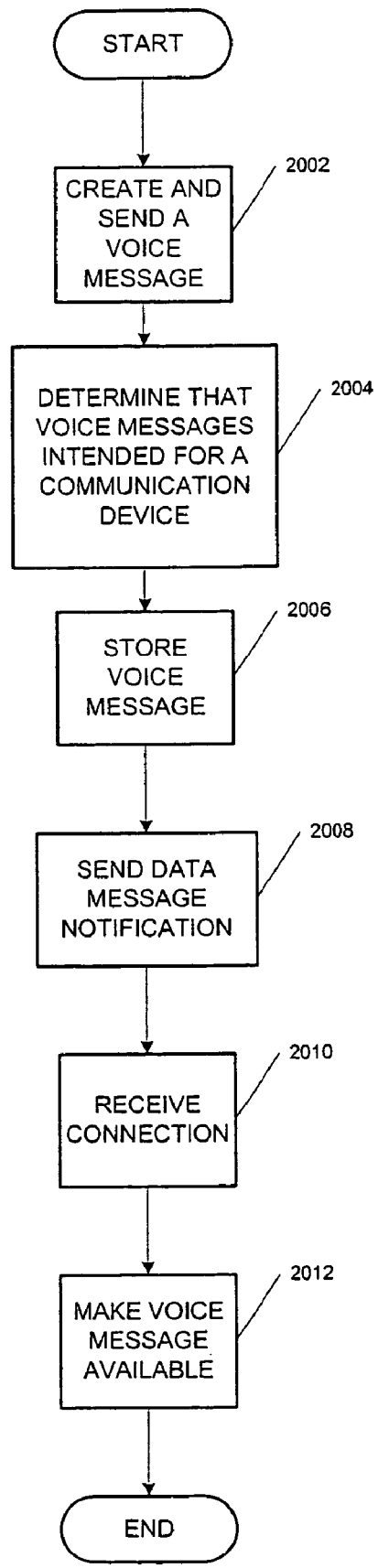
FIG. 7 is a flow chart illustrating an example method for communicating voice messages between communication devices within the system of FIG. 6 in accordance with one embodiment.

FIG. 7 illustrates an example method for communication device-to-communication device voice messaging in accordance with the systems and methods described herein. First, in step 2002, a first communication device can initiate a voice message as described above. Thus, step 2002 can comprise the first communication device receiving a spoken reply and converting it into a voice message that is attached to a data message and transmitted to a message authority 1406. Alternatively, step 2002 can comprise the first communication device receiving a spoken reply and transmitting the spoken reply to a message authority 1406. Message authority 1406 can be configured to then convert the received spoken reply into a voice message.

In either case, the voice message can ultimately have an identifier that can be used to determine a communication device that is the intended recipient of the voice message. Message authority 1406 can be configured to determine, in step 2004, that the voice message is intended for another communication device and to store the voice message in step 2006. In step 2008, message authority 1406 can be configured to then send the intended communication device a data message informing the user of the intended communication device of the pending voice message.

In step 2010, the intended communication device can connect with message authority 1406 and request the voice message. In response, message authority 1406 can be configured to make the voice message available in step 2012.

Several things should be noted about the process of FIG. 7. First, the user can connect with message authority 1406 using the intended communication device and request the pending voice message using a transmit action as described above. Thus, the data message sent in step 2008 can include an identifier that can be used to identify a reply path that the intended communication device can use to retrieve the pending voice message. Second, making the voice message available in step 2012 can comprise message authority 1406 sending the voice message as voice signals through network 1404 to the intended communication device. Alternatively, the voice message can be sent to the intended communication device, e.g., attached to a data message, where it can be stored and played by the intended communication device.

Thus, including a message authority that is configured for greater capability can increase the functionality of the systems and methods described herein, e.g., by allowing a user of a client device to initiate communication by sending a data message to a communication device, such as a communication device 1402, or by enabling voice messaging between communication devices, such as communication devices 1402.

Figure 8:
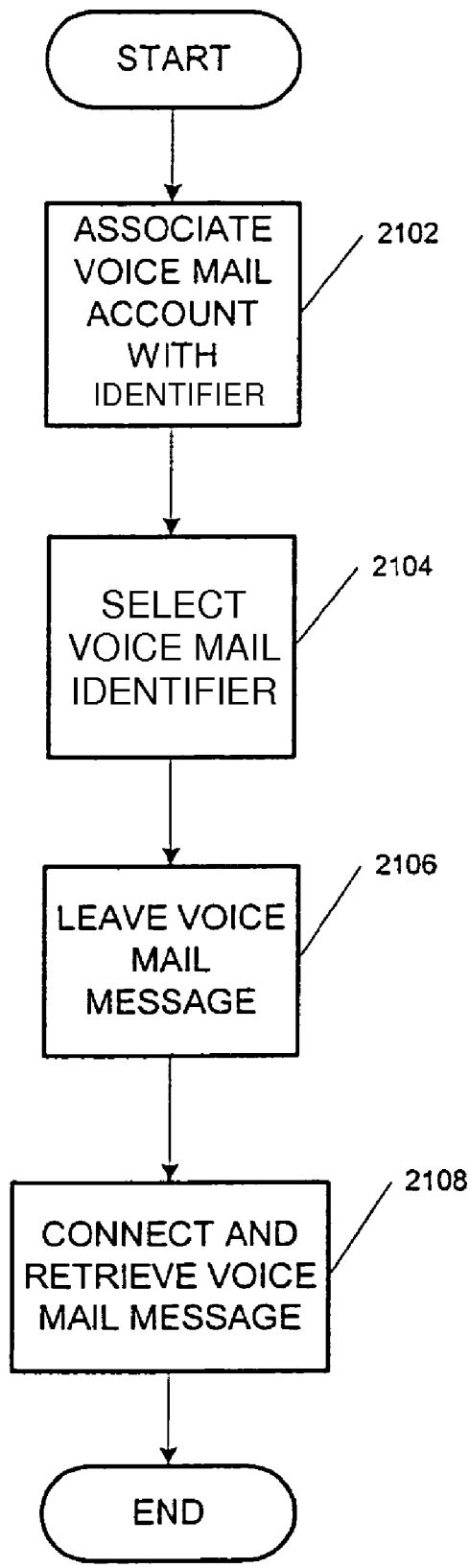
FIG. 8 is a diagram illustrating an example embodiment for directly populating a voice message in box with a voice message using a transmit action in accordance with one embodiment of the invention.

FIG. 8 is a flow chart illustrating an example method for directly populating a voice mail account using a transmit action in accordance with one embodiment of the systems and methods described herein. First, in step 2102, a contact's voice mail account can be associated with an identifier that can be used by a user of, e.g., a communication device 1402 to generate a voice mail message for the contact using a simple transmit action. For example, recall in the example implementation above, wherein a contact's email address is associated with a push-to-talk number. Thus, in step 2302, a communicating path that identifies a contact's voice mail account can be associated with a push-to-talk number instead, or in addition to, associating the contact's email address with a push-to-talk number.

If the user of a communication device 1402 wants to leave a voice mail message for the contact, they can simply select the number associated with the voice mail account in step 2104, initiate a simple transmit action in step 21 06, and leave a voice mail message in step 2108. With conventional push-to-talk systems, a user can attempt to initiate a push-to-talk communication; however, if the intended recipient is not available, then the attempt fails. Thus, the process of FIG. 8 provides a means whereby push-to-talk systems, for example, can be used to leave voice mail messages. Further, the inefficiency of conventional voice mail can be avoided. In other words, there is no need to attempt a connection, wait to be transferred to voice mail, and then listen to, or navigate through, a menu system in order to leave a voice mail message.

In embodiments, where for example a message authority 1406 is used to host the voice mail account. The voice mail message can even be left as a voice message. Thus, the intended recipient can be sent a data message indicating that a pending message is waiting in step 2110. The user recipient can then retrieve the pending voice message using a single transmit action as described in relation to FIG. 7.

Figure 9:
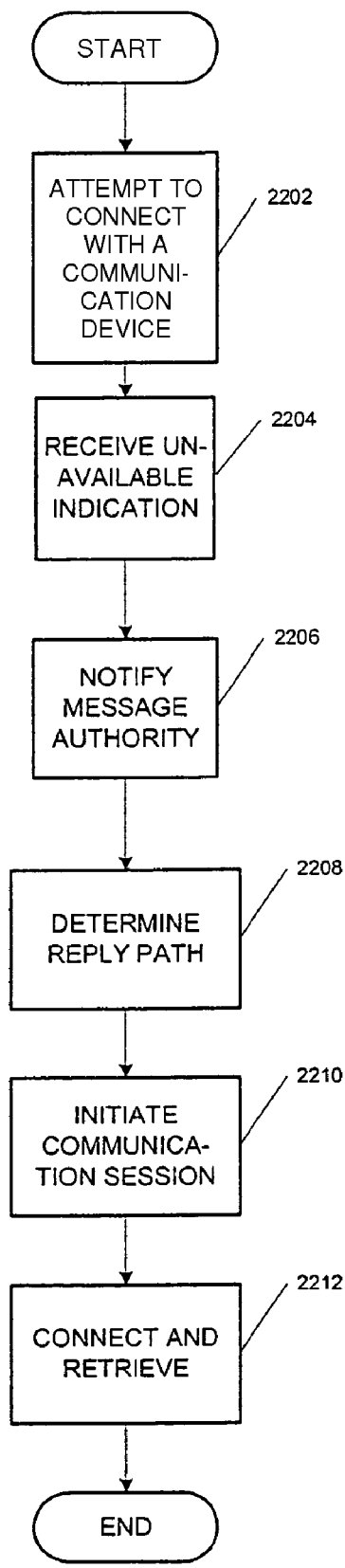
FIG. 9 is a diagram illustrating another example embodiment for directly populating a voice message in box with a voice message using a transmit action in accordance with one embodiment of the invention.

In one embodiment, a user of a communication device 1402 can attempt to first communicate directly with a user of a second communication device, but receives an indication that the user is not available. FIG. 9 is a flow chart illustrating such an embodiment in accordance with the systems and methods described herein. As with the process illustrated in FIG. 21, voice mail account reply path associated with a user of a communication device 1402 has been associated with an identifier that can be used to identify the reply path. First, in step 2202, a user attempts to connect with another communication device 1402 using, for example, a transmit action. Thus, the user can select an identifier associated with the other communication device 1402, or a user thereof. Initiating the transmit action can then cause the user's communication device to attempt to connect with the other communication device 1402 in step 2202.

In step 2204, the user can receive, via his communication device, an indication that the other user is not available. Additionally, message authority 1406 can be notified, in step 2206, that the connection between the two communication devices was not completed. Message authority 1406 can receive, as part of the notification, an identifier that can be used to identifier the communication device attempting the connection an identifier that can be used to identify the communication device with which a connection is being attempted.

In step 2208, message authority 1406 can be configured to determine a reply path associated with a voice mail account that is associated with the user of the second communication device. In step 2210, message authority can be configured to then initiate a communication session with the communication device attempting the connection and send a voice signal to the first communication that asks the user if the user would like to leave a voice mail message for the other user. Thus, the user of the first communication device is now engaged in a communication session, e.g., a push-to-talk communication session, with message authority 1406; however, the identifier included with the voice signal can be the identifier associated with the voice mail account.

Thus, if the user initiates a response to the voice signal, e.g., using a transmit action, in step 2212, the user can be automatically connected with the voice mail account and can leave a voice mail message. As with the process of FIG. 8, if the voice mail message is saved as a voice message, then message authority can be configured to send a data message to the communication device associated with the voice mail account indicating that there is a pending voice message. The data massage can include an identifier that can enable the user of the communication device to simply initiate a transmit action to receive the voice message.

The system described in relation to FIGS. 1-9, can be referred to as a push-to-email system. In other words, as described, a user of a mobile device 1402 can send what eventually is an email message by simply highlighting an address, such as a push-to-talk address, associated with the intended email recipient, activate a transmission mechanism, such as a push-to-talk mechanism, and speak into their device 1402 in order to generate an email message that includes a voice message as described above.

The Ser. No. 10/659,936 application describes how information such as a time stamp can also be associated with messaged generated in this fashion; however, more detailed information including location information can often be useful when associated with a message generated by a user of a device 1402. For example, there are many applications in which the ability to generate a message that is time stamp and stamped with a location can increase efficiency and accuracy of reporting.

One such example is the situation where a service technician, delivery truck, garbage truck, etc., needs to report a problem with accessing a residence or location. Often, the time of the report and the fact that the technician, driver, etc., was at the correct location at the agreed upon time needs to be verified. Conventionally, such a technician or driver would need to call into a call center, or dispatch office and report that they are where they are suppose to be at the right time, but no one is home, they cannot gain access, garbage cans are not out, etc. The technician or driver is often forced to wait while the information is verified and they are provided instructions; however, this is extremely inefficient and costly.

Accordingly, in certain embodiments of the systems and methods described herein, the user, e.g., technician, driver, etc., can simply highlight An address, e.g., a recipient identifier such as a push-to-talk number, associated with an email account, which is in turn associated with the call center, dispatch office, etc., on their device 1402 and generate a report by activating the transmit mechanism and speaking their report into the device.

When the message authority 1406 receives the message as described above, it can time stamp the received message using information generated by device 1402 and included with the message or using information generated by authority 1406. Moreover, message authority 1406 can location stamp the message using location based information.

It will be understood that location information can be generated using one of several techniques and any of these techniques can be used in conjunction with the systems and methods described herein. For example, the location information can be generated using the Global Positioning System (GPS). GPS location for a mobile device, such as device 1402, can be generated in one of several ways: The location information can be generated by network 1404. In such cases, the location information can be communicated to message authority 1406 along with the message generated by device 1402. Alternatively, the location information can be generated by device 1402 either on its own, or with the assistance of network 1404. In such cases, the device 1402 can provide the location information along with the message. Additionally, network 1404 can use a triangulation technique or a more general location technique based on the location of a cell tower with which the device is communicating to obtain location information for device 1402, which can be communicated to message authority 1406.

Once the location information is received, it can be stored along with the time stamp and message by message authority 1406. Message authority 1406 can then generate an email message to be forwarded to the intended recipient. As described above, the email message can comprise a voice message. But in addition, the email message can comprise the time and location stamp information.

In one embodiment, the location information can actually comprise what is more properly referred to as position information, e.g., in latitude and longitude; however, message authority 1406 can be configured to convert this information into true location information, e.g., a location on a map, that can be included with email message. In other embodiments, a third party service, and server, can be used to generate the location information, i.e., message authority 1406 can be configured to provide the position information to a location server, which can be configured to supply location information that can be embedded in an email.

Figure 10:
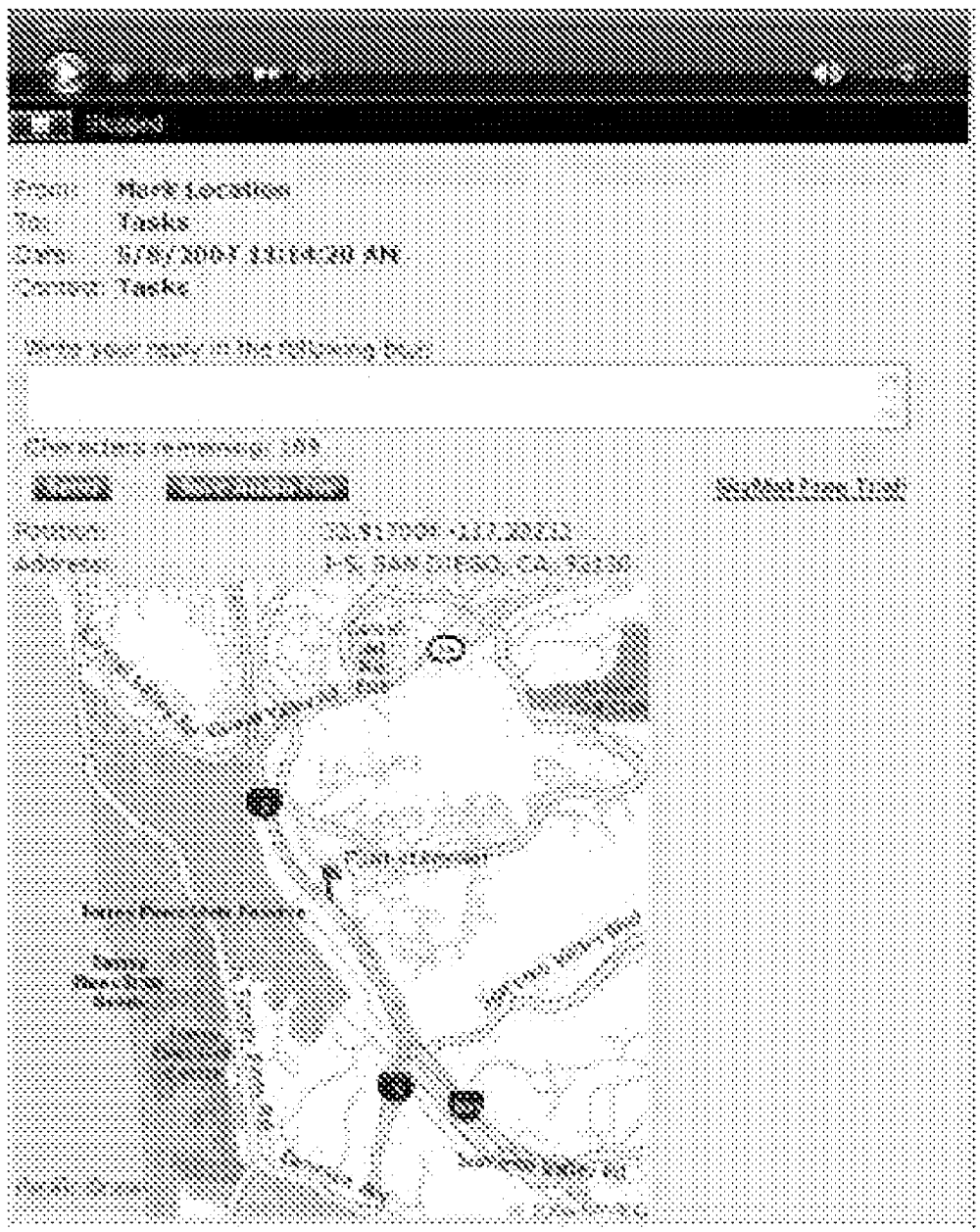
FIG. 10 is a screen shot illustrating an example email screen that can be generated when a voice message is viewed in accordance with one embodiment.

For example, FIG. 10 is a screen shot illustrating the content of an example email message that includes location information in accordance with one embodiment. As can be seen, message authority 1406 can be configured to take the location information for device 1402 and integrate with map information, which can be included in the email received by the intended recipient. As can also be seen, the actual position, i.e., latitude and longitude, can be displayed as well, in this case just above the map. Further, a physical (e.g. street) address can be provided if required and depending on the embodiment. Also, the time stamp can be included, in this case next to the date.

The recipient can then open the email at their convenience and review the information, e.g., the time stamp, location, and message, and verify the contents therein. Thus, for example, if a technician has arrived at a residence to perform some kind of repair or installation and no one is home, he can send an email indicating such and then move on to his next appointment without waiting. The dispatcher, or whoever receives the email can, when convenient, open the email hear the message, see when it was sent and verify that the technician was at the appropriate location. Moreover, the technician can send all this information simply by highlighting the appropriate recipient identifier, e.g., push-to-talk number associated with the email account, activating the transmit mechanism, e.g., push-to-talk mechanism, and speaking the message.

The information can then be used, for example, if the customer calls and contests whether they were home or not. In such instances, the dispatcher will have evidence that the technician was at the appropriate physical address at the appropriate time. The company can then, for example, charge the customer a fee, or additional fee to send the technician back out. Further, the technician does not get further behind while he waits for instructions.

Depending on the type of mobile device being used, video or photographic information can also be sent with the message. For example, if a garbage collector is at a residence and a car is blocking access to the garbage bin, the collector can send a message, which will be time stamped and location stamped as described above. But in addition, the collector can take a picture showing the car's position relative to the garbage bin and send the picture along with the message. The picture can then also be stored by message authority 1402 and imbedded in the email message sent to the recipient.

Another example is that of social workers making onsite child observation reports are. Using the systems and methods described above, the social worker can use their mobile device 1402 to make the full report, or to simply indicate when they arrive and/or depart, or both. This can then provide verification of when the social worker arrived, how long they stayed, and whether they were at the right address during the appropriate time.

Another example is on location insurance appraisals. In such situations, the ability to send images, e.g., of damage can also be extremely beneficial.

In other embodiments, a link to the voice message, location information, and/or other information, such as pictures or video, can be included in the email message instead of the actual information. This can be preferable because, for example, there can be a noticeable delay involved in generating the location information. Moreover, this can allow for greater interactive capabilities. For example, if a user clicks on the link as is connected to a web page that includes the location information, e.g., a map, the web page can be configured to allow the user to zoom in and out on the location, get a satellite view of the location, get directions to the location, etc., functionality that cannot easily be included in an email.

Figure 11:
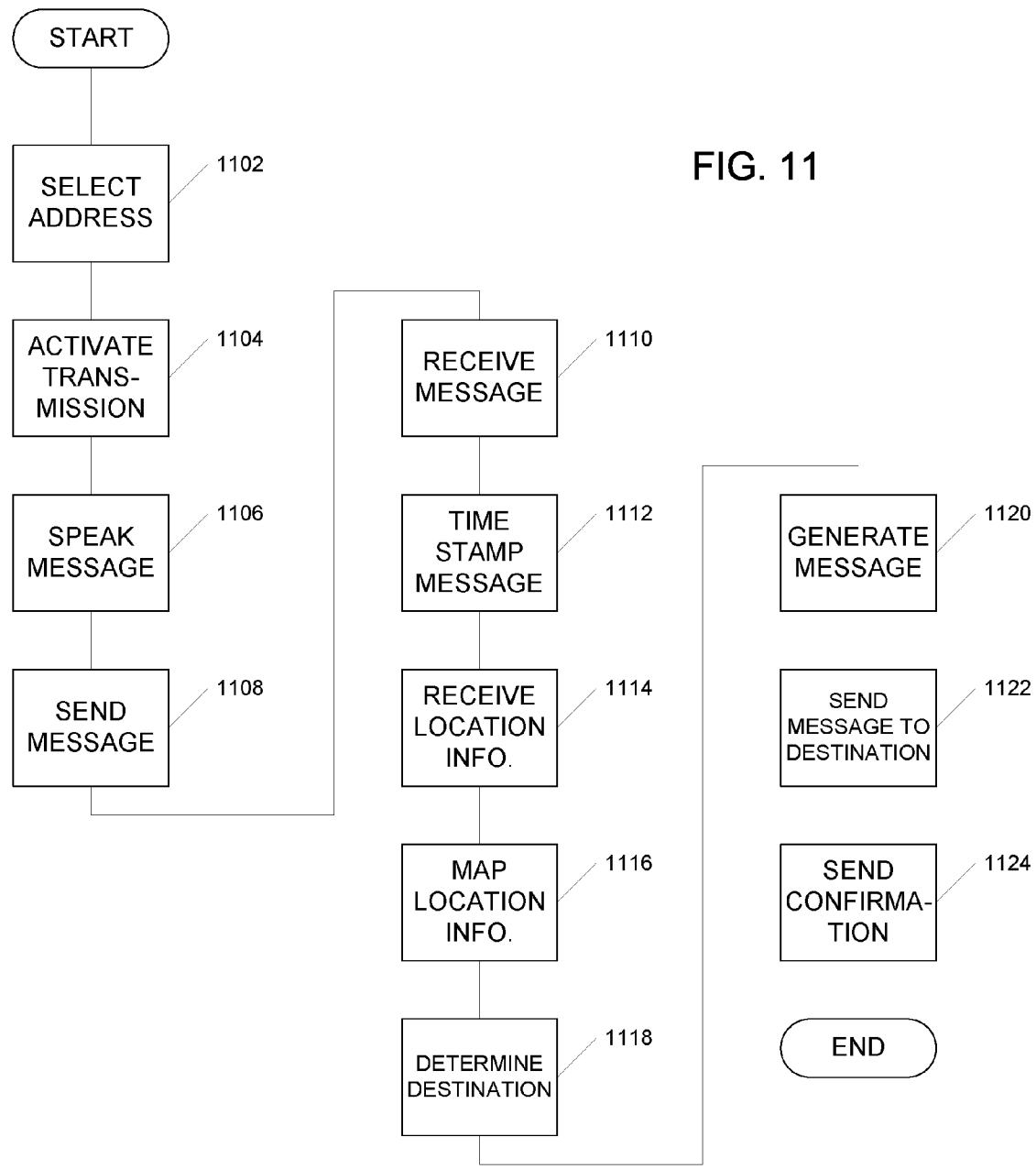
FIG. 11 is a flow chart illustrating an example method for generating a push-to-email message that includes voice message and location information in accordance with one embodiment.

FIG. 11 is a flow chart illustrating an example method for generating a push-to-email message that includes location information in accordance with one embodiment. In step 1102, the user of device 102 can select an address, e.g., a push-to-talk number, associated as described above with a destination recipient address, e.g., associated with a call center, home office, dispatch office, etc. In some embodiments, e.g., as described below, this address can be the actual destination address. In other embodiments, this address can be an intermediate messaging address. In step 1104 the user can then activate a transmit mechanism, e.g., a push-to-talk transmit mechanism, and speak the message in step 1106 into device 1402.

In step 1108, the user can cause the message to be sent to the selected address. This can, as described above involve deactivating, e.g., releasing the transmit mechanism, or by activating a separate send mechanism.

In step 1110, the message can be received by message authority 1406 and the message can be time stamped, or the time stamp information can be extracted from the message. In step 1114, message authority 1406 can receive the location information. As mentioned above, this does require that message authority 1406 be tied into whatever location service/system is being implemented in network 1404.

In certain embodiments, message authority 1406 can be configured to map the location information using a mapping program, application service, etc., as illustrated in step 1116. In other embodiments, message authority 1406 can be configured to make use of a third party location server to generate the location information, e.g., map.

In step 1118, message authority can determine the destination for the message. For example, this can comprise the message authority determining an email address for the message based on the address, i.e., push-to-talk number, used by device 1402 in step 1102. In certain embodiments, compound indexing as described above and in the Ser. No. 10/659,936 application can be used to determine the destination address.

In step 1120, message authority can then generate the message and embed the voice message, time stamp, and location information as described above. In other embodiments, a link to this information can be embedded in the message. The message can then be sent in step 1122.

In certain embodiments, a confirmation can be sent to device 1402 in step 1124. The confirmation can communicate one of several things depending on the embodiment. For example, the confirmation can convey that the message was received by message authority 1406, that it was sent to the destination by message authority 1406, and/or that it was opened by the recipient.

In certain embodiments, message authority 1406 can be configured to act more as a simple relay for the voice message. In other words, device 1402 can be configured to obtain and store the voice message, location information, time stamp and any other information and embed them in a message. Message authority can be configured to them simply forward the message to the appropriate destination.

In other words, device 1402 can be configured to perform some of the functions performed by message authority 1406 as described in the above embodiments. For example, if device 1402 is a programmable phone with built-in GPS, email, and voice recording capabilities, then device 1402 can be configured to let the user select an email recipient, push one button, and speak, automatically record the message, until the button is released (or a second button is pushed), automatically determine the geographical position, and automatically generate and send to the recipient an email containing the voice recording, location information, and time stamp.

In certain other embodiments, message authority 1406 can be configure to convert the voice message to text, e.g., using a voice-to-text conversion algorithm, and embed the text into a message sent to the destination or accessed via a link by the destination.

In still other embodiments, message authority 1406 can be configured to allow the user of device 1402 to select which recipients can receive the location information, such that location information is not sent to all recipients.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A method for generating a data message with location information in a message authority, the message authority comprising a server system have a collector, a data center and a communication server, the method comprising:
   receiving a voice message from a mobile communication device, the mobile device being associated with a reply path;
   receiving position information associated with the mobile communication device;
   a processor storing the voice message and position information;
   a processor associating a reply path identifier associated with the reply path of the mobile communication device with one of a plurality of intermediate addresses associated with the message authority; and
   transmitting a data message to an intended recipient, the data message allowing the recipient to access the voice message and position information,
   wherein the data message includes an identifier that can be used in combination with the intermediate address to determine the reply path associated with the mobile communication device.

2. The method of claim 1, further comprising generating location information based on the position information and storing the location information.

3. The method of claim 1, further comprising:
   determining a message address for the intended recipient associated with the voice message based on information included in the received message; and
   transmitting the data message to the recipient via the determined message address.

4. The method of claim 3, wherein the message address is an email account and the data message is an email message, and wherein determining a message address for the intended recipient comprises determining a path associated with an email account based on an identifier included with the received voice message.

5. The method of claim 1, further comprising:
   generating a time stamp and associating the time stamp with the received voice message; and
   storing the time stamp, and wherein the data message allows the recipient to also access the time stamp.

6. The method of claim 5 wherein the time stamp is generated by the message authority.

7. The method of claim 5 wherein the time stamp is generated based on information received with the voice message.

8. The method of claim 1, further comprising converting the position information to location information and storing the location information, and wherein the data message allows the recipient to also access the location information or to access the location information in lieu of the position information.

9. The method of claim 8, wherein converting the position information to location information comprises generating a map and highlighting the position of the mobile communication device on the map using the location information, and wherein the method comprises embedding the map or a link to the map in the data message.

10. The method of claim 8, wherein the position information comprises latitude and longitude information associated with the position of the mobile communication device, and wherein converting the position information into location information comprises determining a physical address on a map associated with the position information and associating the address with the mobile communication device.

11. The method of claim 10 further comprising generating a map of the area around the address, highlighting the address on the map, and embedding the map or a link to the map in the data message.

12. The method of claim 1, further comprising sending a confirmation to the mobile communication device once the voice message has been received by the message authority.

13. The method of claim 1, further comprising sending a confirmation to the mobile communication device once the data message has been road or received by the intended recipient.

14. The method of claim 1, further comprising converting the voice message to text.

15. The method of claim 1, further comprising receiving an election associated with the intended recipient indicating whether to allow the recipient to access the position information, and making the position information available to the recipient only if the selection indicates the recipient is allowed access.

16. The method of claim 1, wherein making the voice message and position information available comprises embedding it into the data message.

17. The method of claim 1, wherein making the voice message and position information available comprises embedding a link to the stored voice message and position information into the data message.

18. The method of claim 17, further comprising receiving an indication that the link has been selected and serving a web page to the recipient that includes the voice message and location information.

19. A message authority configured to generate a data message with a location stamp, the system comprising:
   a receiver configured to receive a voice message from a mobile communication device, the mobile communication device being associated with a reply path;
   a receiver configured to receive position information associated with the mobile communication device;
   a processor configured to store the voice message and position information and configured to associate a reply path identifier associated with the reply path of the mobile communication device with one of a plurality of intermediate addresses associated with the message authority; and
   a transmitter configured to transmit a data message to an intended recipient, the data message allowing the recipient to access the voice message and position information,
   wherein the data message includes an identifier that can be used in combination with the intermediate address to determine the reply path associated with the mobile communication device.

20. The message authority of claim 19, further comprising a receiver configured to receive location information based on the position information, and wherein the processor is further configured to store the location information.

21. The message authority of claim 20, wherein the location information further comprises a map that highlights the position of the mobile communication device on the map using the location information, and wherein the processor is further configured to embed the map or a link to the map in the data message.

22. The message authority of claim 19, wherein the processor is further configured to determine a message address for the intended recipient associated with the voice message based on information included in the received message, and wherein the transmitter is further configured to transmit the data message to the recipient via the determined message address.

23. The message authority of claim 22, wherein the destination address is an email account and the data message is an email message, and wherein determining a message address for the intended recipient comprises determining a reply path associated with an email account based on an identifier included with the received voice message.

24. The message authority of claim 19, wherein the processor is further configured to generate a time stamp and associating the time stamp with the received voice message; and store the time stamp, and wherein the data message allows the recipient to also access the time stamp.

25. The message authority of claim 24, wherein the time stamp is generated by the processor based on information received with the voice message.

26. The message authority of claim 19, wherein the position information comprises latitude and longitude information associated with the position of the mobile communication device.

27. The message authority of claim 19, wherein the processor is further configured to send a confirmation to the mobile communication device once the voice message has been received by the message authority.

28. The message authority of claim 19, wherein the processor is further configured to send a confirmation to the mobile communication device once the data message has been read or received by the intended recipient.

29. The message authority of claim 19, wherein the processor is further configured to convert the voice message to text.

30. The message authority of claim 19, further comprising a receiver configured to receive an election associated with the intended recipient indicating whether to allow the recipient to access the position information, and wherein the message authority is configured to make the position information available to the recipient only if the selection indicates the recipient is allowed access.

31. The message authority of claim 19, wherein the processor is further configured to make the voice message and position information available by embedding it into the data message.

32. The message authority of claim 19, wherein the processor is further configured to make the voice message and position information available by embedding a link to the stored voice message and position information into the data message.

33. The message authority of claim 32, further comprising a receiver configured to receive an indication that the link has been selected, and a server configured to serve a web page to the recipient that includes the voice message and location information when such as selection has been received.

34. A mobile communication device, comprising:
   a microphone;
   a position determination circuit configured to determine the position of the mobile communication device;
   an email client configured to generate an email message for an intended recipient;
   a voice recorder configured to record a voice message spoken into the microphone; and
   a processor configured to:
      receive a selection of email recipient,
      generate a timestamp associated with a voice message recorded using the voice recorder,
      generate an email containing the voice recording, position information, and time stamp using the email client: and
   a transmitter configured to transmit the email,
      wherein the email message includes an identifier that can be used to determine a reply path associated with the mobile communication device.

35. The mobile communication device of claim 34, further comprising a voice message input mechanism configured to cause the voice recorder to start recording a voice message.

36. The mobile communication device of claim 35, wherein the voice message input mechanism is a push-to-talk input mechanism.

* * * * *